Oct. 23, 1956     W. W. SPOONER     2,767,667
STEAMING OF FOOD PRODUCTS
Filed Aug. 21, 1951     4 Sheets-Sheet 2
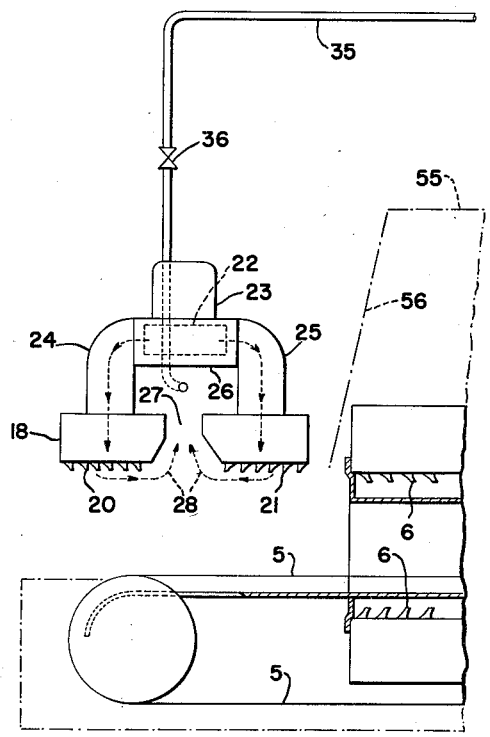
FIG.1.a.
INVENTOR
WILLIAM W. SPOONER
BY Jewett, Mead, Browne & Schuyler
ATTORNEY

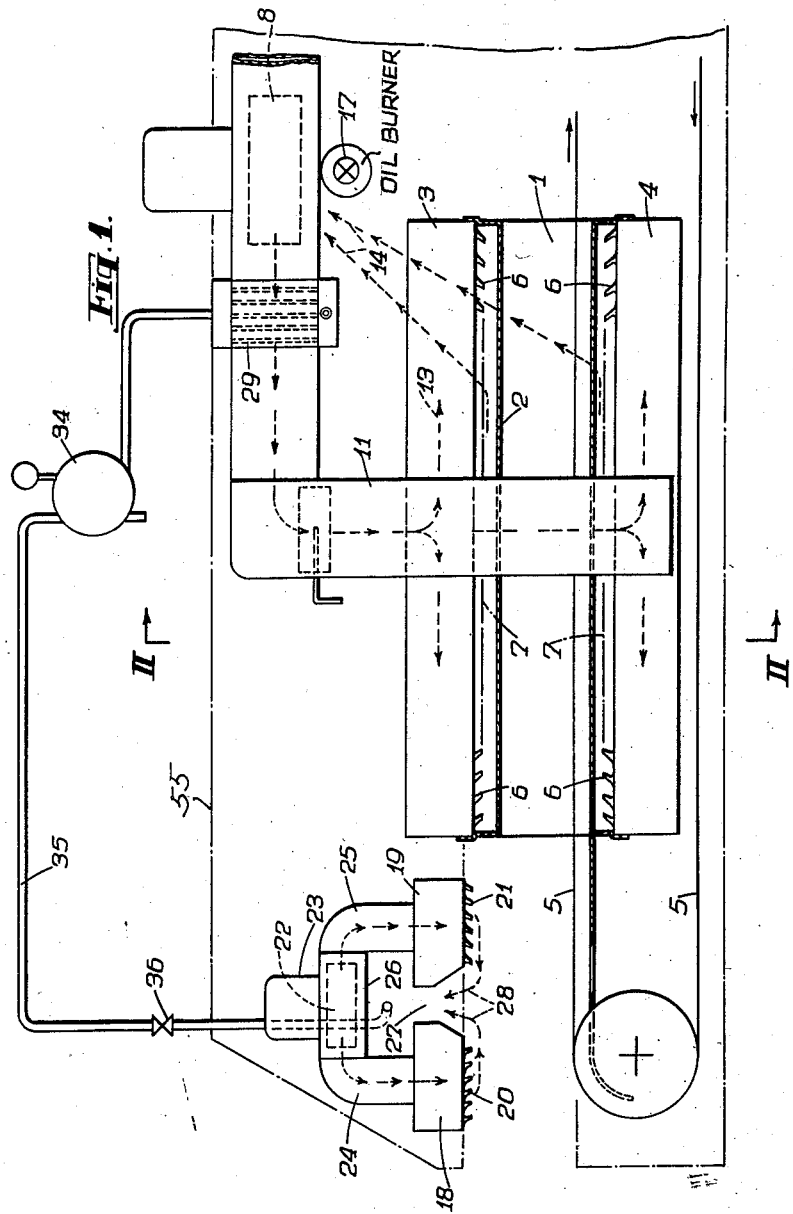

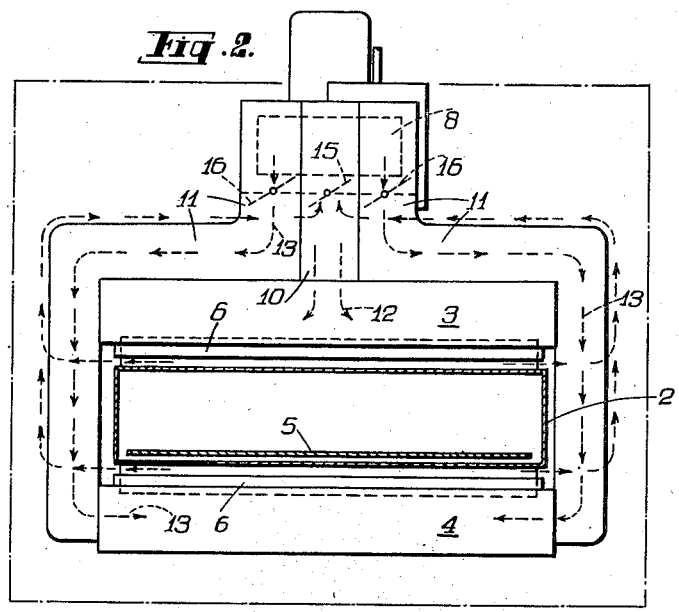
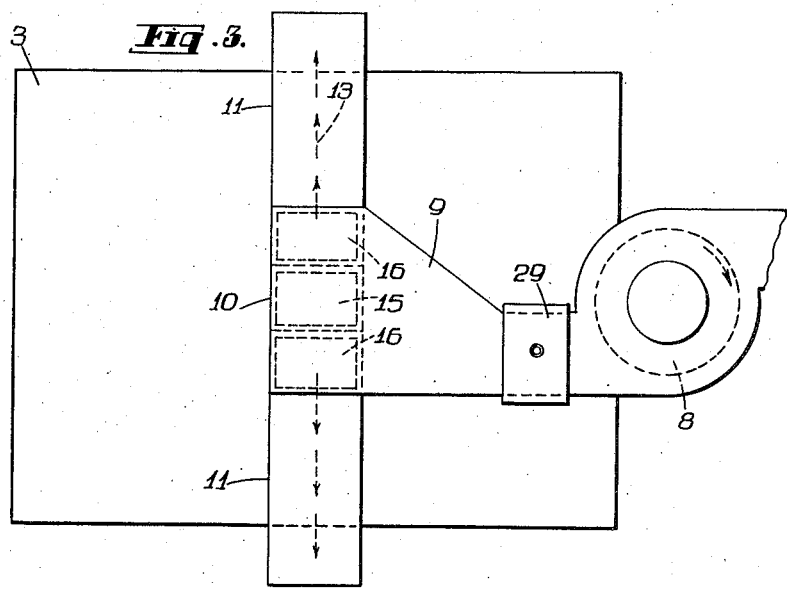

Oct. 23, 1956  W. W. SPOONER  2,767,667
STEAMING OF FOOD PRODUCTS
Filed Aug. 21, 1951  4 Sheets-Sheet 4
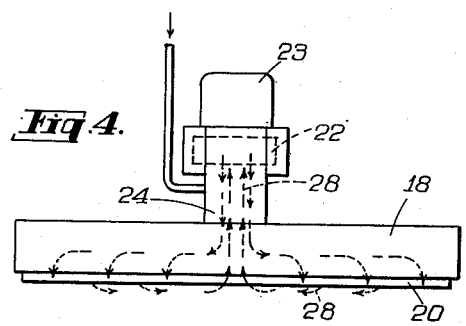
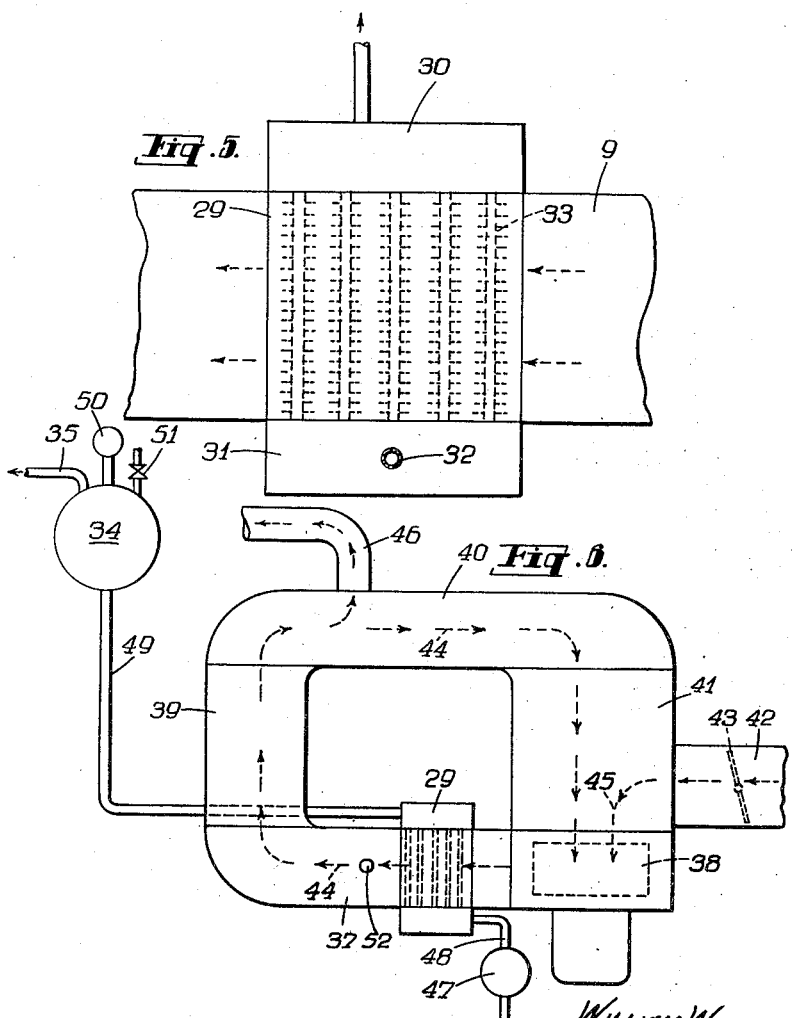

United States Patent Office 2,767,667
Patented Oct. 23, 1956

2,767,667

STEAMING OF FOOD PRODUCTS

William Wycliffe Spooner, Ilkley, England, assignor to Spooner Food Machinery Engineering Company Limited, Ilkley, England, a British company Application August 21, 1951, Serial No. 242,944

Claims priority, application Great Britain August 22, 1950

11 Claims. (Cl. 107—54)

The present invention relates to the steaming of food products to be baked in a baker's oven of the straight-through or tunnel type, that is to say, in a relatively shallow oven through which food products are traversed on a conveyor through the oven in a single flight as distinct from a so called swing-tray oven which is a relatively deep oven through which the food products are traversed in two or more flights one above the other.

The steaming of certain food products, for example dough in the baking of bread, is desirable in order to break down the starch cells of the surface of the goods whereby to produce a smooth and shiny surface on the baked product and to keep the skin of the product plastic while expansion is taking place.

In the baking of bread in swing-tray ovens steaming has been achieved by providing the oven with a crown to which steam is supplied and in which it is entrapped and by passing the dough through the steam in the crown of the oven. This arrangement is not wasteful of steam but necessitates a relatively slow movement of the dough through the crown of the oven to allow of sufficient steaming of the dough.

With ovens of the straight-through or tunnel type it has been proposed to project steam onto the dough from an apertured steam tube at the inlet end of the oven but this has proved very wasteful of steam even though calculated to produce the required steaming effect more quickly than in swing-tray ovens.

The object of the present invention is to enable steaming to be achieved in a straight-through or tunnel type oven both economically and quickly.

According to the present invention food products to be baked, for example lumps of dough in the baking of bread, are traversed along a given path which includes movement through a straight-through or tunnel type oven and during an early portion of the path of travel are subjected to the impingement of jets of steam circulating in a closed circuit which includes a limited locality of the said path of travel of the food products and to which fresh steam is fed at a rate less than the rate of flow of steam around said closed circuit but sufficient to make up the losses of steam therefrom.

The steam jets may be applied to the food products in an initial section of the oven or in a separate steaming unit more or less of tunnel-like form arranged in advance of the oven.

The present invention achieves a great economy of steam consumption because the same steam can be used over and over again and there is no great amount of spillage of steam from the closed circuit. With the previous arrangement in which steam was merely projected from an apertured steam tube the greater the quantity of steam projected per unit time the greater was the steam consumption because all of the steam projected was allowed to go to waste. It is desirable however, according to the present invention, that there should be a moderate degree of steam spillage for the purpose of preventing ingress of air into the region where steaming is taking place but such spillage can be more or less limited to the degree required for preventing ingress of air and the rate of steam circulation and steam projection onto the food products can be more or less independent of the steam spillage. Thus the steaming operation can be hastened without any undue increase of steam consumption per unit time or per unit quantity of food products treated.

A further advantage of the present invention is that by carefully controlling the rate of steam spillage to prevent ingress of air it is possible to avoid undue dilution of the steam with air thereby maintaining a high proportion of steam in the circulating medium so as to achieve rapid treatment of the food products.

The steam may be applied to the food products by a slit-like nozzle or a number of slit-like nozzles preferably of convergent form which may extend transversely across the path of travel of the products. The steam may be caused to flow in a closed circuit by a suitable fan or impeller which feeds the steam through the nozzle or nozzles and then withdraws the steam from the food products almost immediately after impingement thereon.

The axis or axes of the nozzle or nozzles may be inclined towards the goods and preferably two transverse nozzles or two groups of transverse nozzles are oppositely inclined towards one another and towards the goods so that the jets of steam will converge towards the goods thereby facilitating withdrawal of the steam through a common outlet communicating with the fan or impeller.

The invention is preferably applied to a baking oven which is heated chiefly or almost entirely by forced convection so that heat is applied primarily to the goods to be baked and only secondarily and incidentally to the oven itself, as distinct from ovens which rely chiefly on radiant heat or upon radiant heat together with a limited degree of heating by forced convection.

In a straight-through or tunnel type oven heated chiefly or entirely by forced convection, a gaseous heating medium may be projected upon the goods to be baked from nozzles formed in the wall of pressure chambers located above and below the path of travel of a conveyor on which the food products are traversed through the oven.

In connection with an oven heated chiefly or almost entirely by forced convection an important feature of the present invention consists in raising steam for the steaming operation by interchange of heat from the gaseous heating medium employed in the forced convection system.

It is preferable that the gaseous medium in the forced convection system of the oven should be caused to flow in closed circuit and a heat steam raising interchanger fed with water for the raising of steam may be inserted in the circuit of the gaseous medium.

Alternatively the steam may be raised in a steam raising heat interchanger located in a separate closed circuit and fed with gaseous medium bled off from the oven circuit, whereby a relatively small fraction of the total gaseous medium in the oven circuit is caused to flow in a separate closed circuit and to impinge repeatedly upon the heating surface of the heat interchanger for the purpose of raising steam.

The steam may be raised in a finned or gilled tube or coil or in a set of such tubes or coils located either in a main trunk of the oven circuit through which the gaseous medium is circulated or in a separate circuit of its own with a separate fan which circulates the gaseous medium bled from the oven in a closed circuit from the fan to the tube or tubes and back to the fan. The volume rate of flow of the gaseous medium in the steam raising circuit is greater than and preferably a substantial multiple of the volume of gaseous medium circulating in the circuit.

The invention is further described by way of example with reference to the accompanying drawings in which:

Fig. 1 is a somewhat diagrammatic side view partly in section illustrating the inlet end of a straight-through or tunnel type oven provided with a steaming unit according to the invention.

Fig. 1a is a view similar to Fig. 1 in part showing the steaming unit located outside of the oven casing and just before the inlet end of the oven.

Fig. 2 is a part sectional end view taken on the line II—II of Fig. 1.

Fig. 3 is a plan view of one part of Fig. 1.

Fig. 4 is a side view of another part of Fig. 1.

Fig. 5 is a detail view illustrating the heat interchanger and

Fig. 6 is a side view illustrating an alternative arrangement of the steam raising interchanger.

Fig. 1 illustrates the inlet end of a straight-through or tunnel type oven heated chiefly or entirely by forced convection i. e. by the projection of a gaseous medium either onto the food products or onto heating surfaces near the food products.

The portion of the tunnel indicated generally in Fig. 1 by the reference numeral 1 is bounded above and below by a shield plate 2 immediately above and below which are located upper and lower pressure chambers 3, 4. The shield 2 is of box section as illustrated in Fig. 2.

The upper run of the conveyor 5 travels through the oven from left to right whilst the lower run of the conveyor passes beneath the lower pressure chamber 4. The lower wall of the upper pressure chamber 3 and the upper wall of the lower pressure chamber 4 have formed therein nozzles 6 through which a gaseous heating medium is projected on to the shields 2 to heat the same and thus to heat the food products on the conveyor.

Only a few of the nozzles 6 are shown in Fig. 1 but the lines 7 indicate the tips of the nozzles which are provided over substantially the whole length of the pressure chambers 3, 4.

In practice there will be usually a pair of upper pressure chambers 3 and a pair of lower pressure chambers 4 arranged in line and connected to the discharge side of a fan 8 which feeds the gaseous heating medium through ducting 9, 10 to the pressure chambers 3 and ducting 11 to chambers 4. The flow of the heating medium from the ducting 9 into the ducting 10, 11 is controlled by damper 15 and coupled dampers 16 respectively and through ducting 9, 11 to pressure chambers 4 as indicated by the arrows 12, 13 and which withdraws the gaseous medium after impingement on the shield as indicated by the arrows 14.

In any particular oven there may be a plurality of oven sections each consisting of a pair of upper pressure chambers and a pair of lower pressure chambers and a common fan. The shield 2 will usually only be provided either in the first section or between the first two pressure chambers 3, 4 of the first section so that in the subsequent passage of the food products through the oven the heating medium will impinge directly upon the food products and on the underside of the conveyor. A gas or oil burner for maintaining the temperature of the gaseous medium circulating in the oven is indicated at 17.

The steaming unit shown at the left hand end of Fig. 1 is arranged immediately above the end of the conveyor 5 and embodies two pressure chambers 18, 19 each provided with nozzles 20, 21 somewhat similar to the nozzles 6.

The outer casing of the oven is indicated by the reference numeral 55 and encloses the steaming unit within the oven near the entrance of the oven. Alternatively, the upper left-hand part of the oven casing 55 may terminate as indicated by line 56 in Fig. 1a so as to leave the steaming unit just outside of the oven casing and located just before the entrance of the oven.

A fan 22 driven by an independent electric motor 23 discharges through outlet ducts 24, 25 to the pressure chambers 18, 19 from whence the steam is projected in jets from the nozzles 20, 21 to impinge upon the food products on the conveyor 5 whereupon the steam is withdrawn to the suction side 26 of the fan through a common outlet 27 as indicated by the arrows 28.

Thus the steam is caused to flow rapidly in a closed circuit from the fan through the ducts 24, 25, pressure chambers 18, 19, nozzles 20, 21 for impingement upon the food products and thence through the outlet 28 and back to the fan 22.

Steam for making up the steam loss in the steaming unit is raised in a heat interchanger 29 consisting of an upper header 30, a lower header 31 fed with water at 32 and gilled or finned tubes 33 extending between the headers 30, 31. The tubes 33 pass through the ducting 9 near to the discharge of the fan 8. The steam so raised is passed to a steam receiver 34 and from thence through a pipe 35 and valve 36 to a point immediately below the inlet 26 of the fan 22 i. e. in the path of the circulating steam returning to the fan.

By suitably controlling the valve 36 it is possible to adjust the spillage of steam to atmosphere to the left and right of the pressure chambers 18, 19 so as to keep the steam spillage relatively low but sufficient to exclude ingress of air into the circulating steam system.

Instead of arranging the heat interchanger 29 in the main convection ducting of the oven it may be arranged in a separate closed circuit as illustrated in Fig. 6 which is fed with gaseous heating medium bled from the convection system of the oven. In the arrangement according to Fig. 6 the heat interchanger 29 which may be similar to that of Figs. 1 and 5 is arranged in a duct 37 of rectangular form and preferably somewhat wider than the depth shown in Fig. 6 which is connected with a fan 38 by ducts 39, 40 and 41 which may also be of rectangular form. Gaseous medium bled from the convection system of the oven is fed into the duct 41 by means of a duct 42 controlled by a valve 43. The gaseous medium is caused to flow in the closed circuit in the direction of the arrows 44 at a volume rate of flow which is greater than the intake of gaseous medium through the duct 42. The direction of the intake of gaseous medium through the duct 41 is indicated by the arrows 45. Gaseous medium is allowed to escape through a duct 46 from the closed circuit formed by the ducts 37, 39, 40, 41. Water is fed to the heat interchanger 29 by a pump 47 through the pipe 48 and steam is withdrawn from the heat interchanger through a pipe 49, receiver 34 and pipe 35. The receiver is provided with a pressure gauge 50 and relief valve 51. The thermostat is indicated at 52.

The capacity of the fan 38 in relation to the total volume of the gaseous medium flowing in the closed circuit which is constituted by the ducts 37, 39, 40, 41 must be large and preferably a substantial multiple of said total volume so that not only is the rate of flow of the gaseous medium through the closed circuit substantially greater than the total volume of the circuit but is also very much greater than the rate of intake of fresh gaseous medium passing into the circuit through the duct 42. Thus it is possible to raise steam using a relatively low temperature gaseous medium.

The economy of steam consumption which is achieved according to the present invention by circulating the steam and re-projecting it repeatedly upon the goods to be baked permits of the raising of the necessary steam from the gaseous heating medium of the oven without any undue heat loss or temperature drop in the oven as would occur if it were attempted to raise sufficient steam for a steaming operation in which all of the steam projected was allowed to go to waste after impingement upon the food products.

I claim:

1. A method of baking food products in a baker's oven which consists in traversing the food products to be baked, for example lumps of dough in the baking of bread, along a given path, baking the food products whilst in the oven chiefly or entirely by forced convection using a gaseous heating medium, and applying steam to said food products before so baking them by causing steam to circulate in a closed circuit which includes an early and limited portion of said path, causing the steam so circulating to be projected in jets impinging upon the food products at said limited portion of said path, raising steam by interchange of heat with the gaseous medium employed for heating the oven and feeding steam so raised into said closed circuit at a rate less than the rate of flow of steam around said closed circuit but sufficient to make up the losses of steam therefrom.

2. A method according to claim 1 in which part of the steam circulating in said closed circuit is allowed to spill and the rate of steam input into the closed circuit is controlled so as to limit the steam spillage from said closed circuit down to a degree not greatly in excess of that sufficient for the purpose of preventing ingress of air into the closed circuit.

3. A method according to claim 1 in which the gaseous heating medium of the oven is circulated in a closed oven circuit and the interchange of heat between the gaseous heating medium of the oven and water for the raising of steam is carried out in said closed oven circuit.

4. A method according to claim 1 in which the gaseous heating medium of the oven is circulated in a closed oven circuit and in which for the purpose of raising steam gaseous medium is bled from said closed oven circuit and caused to circulate in a separate closed circuit at a rate greater than that at which it is bled from the oven circuit.

5. A method of baking food products in a baker's oven which consists in traversing the food products to be baked, for example lumps of dough in the baking of bread, along a given substantially horizontal path, baking the food products whilst in the oven chiefly or entirely by forced convection using a gaseous heating medium, and applying steam to said food products before baking them by causing steam to circulate in a closed circuit which includes an early and limited portion of said path, causing the steam so circulating to be projected in jets impinging upon the food products at said limited portion of said path, raising steam by interchange of heat with the gaseous medium employed for heating the oven and feeding steam so raised into said closed circuit at a rate less than the rate of flow of steam around said closed circuit but sufficient to make up the losses of steam therefrom.

6. A baker's oven of the straight-through or tunnel type provided with a steaming unit located near the entrance to the oven comprising a pressure chamber located adjacent to the oven conveyor and formed with nozzles in a wall thereof adjacent to the conveyor, said nozzles being of slit-like form and extending transversely across the path of travel of the conveyor and also being of convergent form in a direction towards the conveyor, casing means to enclose food products on the conveyor, a fan communicating at its suction side with said casing means and communicating at its discharge side with said pressure chamber whereby to cause steam to circulate in a closed circuit through said chamber and nozzles and back to the fan, and means for feeding a steam supply into the closed circuit to make good the steam losses therefrom.

7. A baker's oven of the straight-through or tunnel type provided with a steaming unit located near the entrance to the oven comprising a pressure chamber located adjacent to the oven conveyor and formed with nozzles in a wall thereof adjacent to the conveyor, there being at least two nozzles which are oppositely inclined towards one another and towards the conveyor, casing means to enclose food products on the conveyor, a fan communicating at its suction side with said casing means and communicating at its discharge side with said pressure chamber whereby to cause steam to circulate in a closed circuit through said chamber and nozzles and back to the fan, and means for feeding a steam supply into the closed circuit to make good the steam losses therefrom.

8. A baker's oven of the straight-through or tunnel type provided with a steaming unit located near the entrance to the oven comprising a pressure chamber located adjacent to the oven conveyor and formed with nozzles in a wall thereof adjacent to the conveyor, said nozzles being directed towards the conveyor, casing means to enclose food products on the conveyor, a fan communicating at its suction side with said casing means and communicating at its discharge side with said pressure chamber whereby to cause steam to circulate in a closed circuit through said chamber and nozzles and back to the fan, means for feeding a steam supply into the closed circuit to make good the steam losses therefrom, a forced convection system associated with said oven by means of which said oven is substantially completely heated, and a heat interchanger in which steam is raised for the steaming operation, said steam being heated by the gaseous heating medium employed for said forced convection system associated with the oven.

9. In a baker's oven of the straight-through or tunnel type including a conveyor running through the oven, means for circulating a gaseous heating medium within the oven to heat the same mainly by forced convection including nozzle means directed towards the conveyor, a fan, and ducting connecting the discharge side of the fan with said nozzles whereby the gaseous heating medium is circulated from the fan through the nozzles towards the conveyor and then back to the fan in a closed circuit; a steaming unit located near the entrance to the oven comprising a pressure chamber located adjacent to the oven conveyor and formed with nozzles in a wall thereof adjacent to the conveyor, said last named nozzles being directed towards the conveyor, casing means to enclose food products on the conveyor, a fan communicating at its suction side with said casing means and communicating at its discharge side with said pressure chamber whereby to cause steam to circulate in a closed circuit through said chamber and last named nozzles and then back to the fan, means for feeding a steam supply into the closed circuit of the steaming unit to make good the steam losses therefrom; a steam raising heat interchanger located in the closed circuit of the oven convection system, means for feeding water to the heat interchanger, and means for feeding steam therefrom to the steaming unit.

10. In a baker's oven of the straight-through or tunnel type including a conveyor running through the oven, means for circulating a gaseous heating medium within the oven to heat the same mainly by forced convection including nozzle means directed towards the conveyor, a fan, and ducting connecting the discharge side of the fan with said nozzles whereby the gaseous heating medium is circulated from the fan through the nozzles towards the conveyor and then back to the fan in a closed circuit; a steaming unit located near the entrance to the oven comprising a pressure chamber located adjacent to the oven conveyor and formed with nozzles in a wall thereof adjacent to the conveyor, said last named nozzles being directed towards the conveyor, casing means to enclose food products on the conveyor, a fan communicating at its suction side with said casing means and communicating at its discharge side with said pressure chamber whereby to cause steam to circulate in a closed circuit through said chamber and said last named nozzles back to said fan, and means for feeding a steam supply into the closed circuit of the steaming unit to make good the steam losses therefrom; duct means constituting a closed circuit separate from the convection circuit of the oven, a steam raising heat interchanger and a fan in said separate closed circuit, duct means connecting the closed circuit of the oven with said separate closed circuit for the purpose of bleeding gaseous medium from the oven to said separate closed circuit, means for feeding water to said heat interchanger, and means for feeding the steam therefrom to said steaming unit.

11. A baker's oven of the straight-through or tunnel type comprising a conveyor, means to move said conveyor along a given path of travel, spaced apart opposed walls, said given path of travel of said conveyor passing between said opposed walls and said walls each including means to direct heated fluid toward said conveyor as it travels along said path, shielding means located between said conveyor and said heated fluid directing means in an initial portion of the path of travel of said conveyor to shield food products carried by said conveyor from said projected fluid during travel of said food products through said initial portion of said path, a steaming unit located in advance of and adjacent to said shielding means, said steaming unit including means to project steam toward food products carried by said conveyor whereby said food products are steamed prior to being heated by said heated fluid, a fan connected to cause said heated fluid to circulate in a closed circuit through the fan, through said heated fluid directing means toward the conveyor, and then back to the fan, means to raise steam by interchange of heat with the heated fluid utilized to bake food products on said conveyor, said steam raising means being located in said heated fluid closed circuit, and means to feed steam so raised to said steaming unit.

References Cited in the file of this patent

UNITED STATES PATENTS

| | | |
|---|---|---|
| 165,813 | Foerster | July 20, 1875 |
| 546,755 | Blendinger et al. | Sept. 24, 1895 |
| 1,543,128 | Simpson | June 23, 1928 |
| 1,890,681 | Hoppe | Dec. 13, 1932 |
| 2,060,430 | Spooner | Nov. 10, 1936 |
| 2,074,744 | Faucher | Mar. 23, 1937 |
| 2,141,591 | Bonner | Dec. 27, 1938 |
| 2,501,765 | Dumbleton et al. | Mar. 28, 1950 |
| 2,502,172 | Paulsen | Mar. 28, 1950 |
| 2,582,462 | Schrumn | Jan. 15, 1952 |

FOREIGN PATENTS

| | | |
|---|---|---|
| 965,635 | France | Feb. 22, 1950 |
| 978,633 | France | Nov. 29, 1950 |